United States Patent
Pawluczyk

[11] 3,867,009
[45] Feb. 18, 1975

[54] HOLOGRAPHIC MICROSCOPE WITH SUPPRESSION OF COHERENT NOISE

[76] Inventor: Romuald Pawluczyk, Czeeniakowska Str. 18/55, Warszawa, Poland

[22] Filed: May 11, 1973

[21] Appl. No.: 360,376

[30] Foreign Application Priority Data
May 20, 1972 Poland .................................. 155495

[52] U.S. Cl. ................................................. 350/3.5
[51] Int. Cl. ........................................... G02b 27/00
[58] Field of Search .................... 350/3.5, 162 SF

[56] References Cited
UNITED STATES PATENTS
2,770,166 11/1956 Gabor ................................ 350/3.5
3,640,599 2/1972 Van Ligten ......................... 350/3.5

OTHER PUBLICATIONS

Bowman, *Applied Optics*, vol. 7, No. 11, Nov. 1968, pp. 2280–2284.

Primary Examiner—Ronald J. Stern

[57] ABSTRACT

The invention relates to a holographic microscope with suppression of coherent noise, appropriated for recording and reconstruction of holograms, and for interferometric investigations.

4 Claims, 6 Drawing Figures

HOLOGRAPHIC MICROSCOPE WITH SUPPRESSION OF COHERENT NOISE

BACKGROUND OF THE INVENTION

The invention relates to a holographic microscope with suppression of coherent noise, appropriate for recording and reconstruction of holograms as well as for interferometric investigations.

The first known microscope based upon the principle of holography was built by D. Gabor. It employs monochromatic light beam from a high-pressure mercury-vapour lamp for recording and reconstruction of holograms, and has limited application.

In spite of intensive efforts, the coherence length of the light did not exceed 0.1 mm. That implied very rigorous requirements to the accuracy assembling of individual elements, and the entire microscope. The problems and difficulties in employing such systems resulted in that the microscope was not widely used. The requirements could be satisfied only after the advent of lasers emitting intense beams of highly coherent light. A number of microscopic devices based on the principle of laser illumination holography was developed, all of which show a common disadvantage of "coherent noise" reducing the resolving power and the quality of reconstructed images. Included in the term "coherent noise" are all interference-diffraction effects caused by the high degree of coherence of the radiation used, which adversely influence the quality of the optical system imaging.

The causes of coherent noise are generally classified in three groups. In the first of them belongs the so called "speckling" in which the higher diffraction maximum belonging to the image of each point are superimposed on each other in a statistical manner, and interfere with each other, producing characteristic fine spots superimposed on the image. The other group is comprised of the diffraction-interference effects caused by the interference of the direct light wave with the light wave diffracted by edges, scratches and impurities of the optical members. The effects of this type appear as differently shaped lines of decreasing contrast. The third group consists of interference fringes of almost constant contrast, arising in the interference of the multiple light waves reflected from the surfaces of separate optical members, between each other or with the direct light waves. Images produced by the above mentioned effects became superimposed on the proper image, and cause reduction of the quality of the image.

In order to reduce the disadvantageous influence of the coherent noise on the quality of the reconstructed image, in ordinary viewing systems and interferometric systems with laser illumination, several methods of its suppression are applied. In the two-stage holographic process, with specific, highly rigorous requirements to the coherence of the used radiation, the above mentioned methods can be applied for holography only partially, and mainly in reconstruction of the hologram. Thus the methods cannot be satisfactorily used for suppressing the noise introduced during recording of the hologram. Additionally, some of the used methods cause an obliteration of the information contained in the phase structure of the object, and this renders it impossible to apply such methods for interferrometric purposes.

To this date no holographic microscope has been developed, which produces holographic images of sufficiently high quality, and additionally performs interferometric investigations.

The object of the invention is to provide an apparatus which suppress is the coherent noise during recording and reconstruction of the hologram, and which simultaneously can be applied for interferometric investigations. The hologram formed by means of such apparatus is comprised of informations both of the phase and the amplitude of the object being registered, with its resolving power being not lower than that of holograms recorded by means of other apparatus.

SUMMARY OF THE INVENTION

This object is achieved through the design of an optical system of the holographic microscope provided with a device designed for suppression of coherent noise by unidirectional averaging, which is situated in front of the member splitting the laser beam into the object beam and the reference beam. The lightsensitive material and the hologram is located in the image plane of the optical system imaging the object, the plane being simultaneously the real object plane of the eyepiece of the microscope. The optical path length of the reference beam equals that of the object beam with an accuracy up to several millimeters, both beams formed by similar optical systems.

The device for unidirectional averaging of coherent noise consists of a confocal system of focussing lenses, between which the averaging member is positioned. This is a system deflecting the light beam in a single plane, rotating about the axis perpendicular to the optical axis of the microscope together with an adjustable slit coupled with it, and placed in the common focus of the focussing lenses.

The holographic microscope with suppression of coherent noise, according to the invention, will be more particularly described hereinbelow in an exemplary embodiment, with reference to the accompanying drawing.

DESCRIPTION OF THE PREFERRED EMBODIMENTS

DESCRIPTION OF THE PREFERRED EMBODIMENTS

Figure 1:
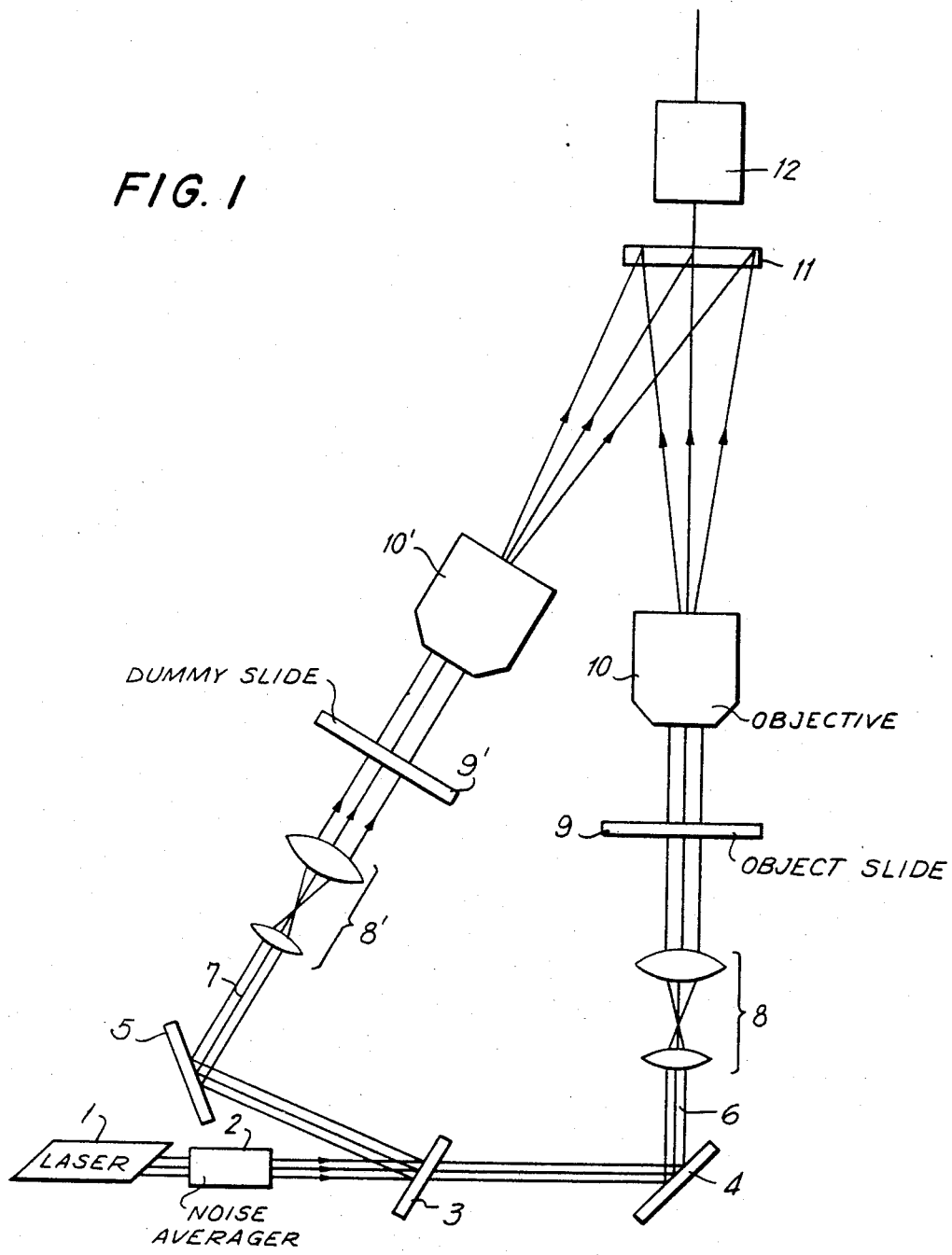
FIG. 1 shows the schematic diagram of the holographic microscope with suppression of coherent noise, according to the invention.

FIG. 1 shows the path of the laser beam 1, and the fundamental assemblies of the holographic microscope arranged along this path, which are:
the device 2 for unidirectional averaging of the coherent noise, the beam-splitting member 3 with auxiliary mirrors 4 and 5, which divides the laser beam into the object beam 6 and the reference beam 7, and which assures the equality of optical path lengths of both beams, the assembly 8 forming the beam illuminating the object 9, the microscope lens 10, the light-sensitive material or the hologram 11 situated in the image plane of the lens, and being simultaneously the object plane of the eye-piece 12. The reference beam is formed through a similar optical system consisting of the assembly 8', which is an equivalent of the assembly 8, the microscopic slide 9', and the lens 10'.

Figure 2A:
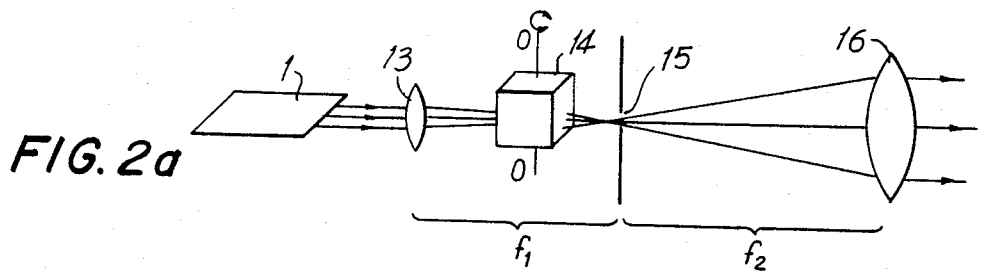
FIG. 2a and 2b show an exemplary version of the device for unidirectional averaging of coherent noise in a holographic microscope.
Figure 2B:
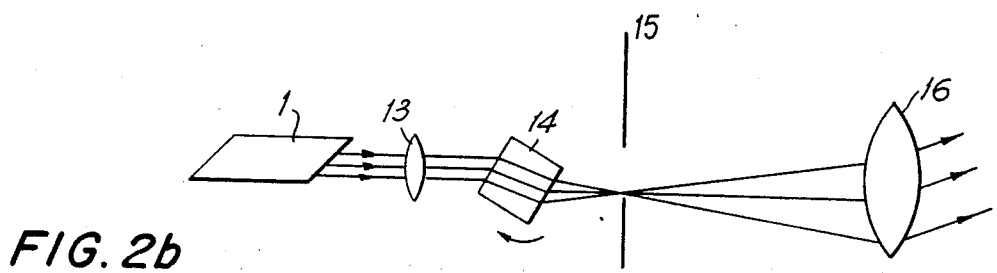

The assembly 2 for unidirectional averaging of the coherent noise consists of (FIG. 2) focussing lenses 13 and 14 situated confocally and forming a telescope system with low magnifying power, member 15 deflecting the laser beam in one direction, continuously or stepwise, and the slit 16 with adjustable length and width, situated in the focus of the laser beam. The averaging member 15, together with the slit 16 are rotatable about the optical axis of the system. The averaging member 15 can be any device causing the deflection of the entering laser beam, along a single straight line, continuously or stepwise. In particular it can be a rectangular prism, made of transparent material, rotating about the optical axis of the system, or a mirror rotating also about a perpendicular axis, or an electro-optical or electro-acoustical light deflector.

For the beam splitting member 3, a partially transparent mirror, a beam-splitting prism, or polarizing-interference beam-splitter can be used. Instead of the auxiliary mirrors 4 and 5 a prism of total internal reflexion may be applied.

For the beam illuminating the object (assembly 8 forming the beam) a conventional condenser may be used or a collimator system giving a parallel beam, especially suitable for interferometric investigations (in some cases the forming system may be omitted). In order to fulfill the condition of the object and reference beam similarity, an optical system for reference beam, having similar parameters, must be used).

Figure 3:
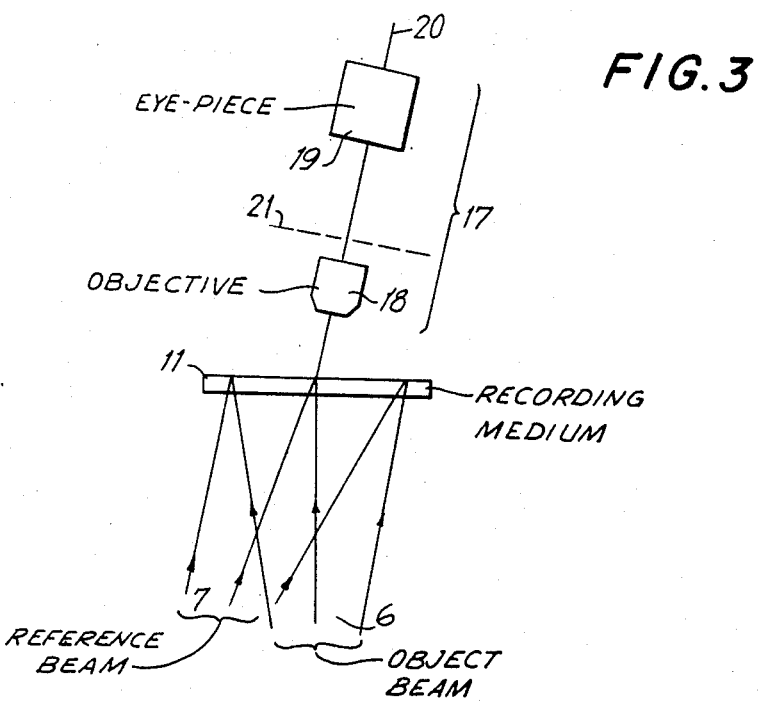
FIG. 3 shows the method of positioning the auxiliary microscope used for adjusting the optical system.

For assuring the correct operation of the auxiliary adjustment, microscope 17 (FIG. 3) is used, having the magnifying power of 150 x to 600 x, consisting of the lens 18 and the eye-piece 19. The optical axis of the auxiliary microscope is directed along the bisectrix 20 of the angle between the object beam 6 and the reference beam 7.

Figure 4:
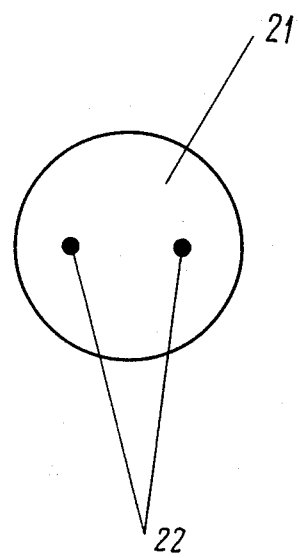
FIG. 4 shows the image seen in the pupil of the microscope, the noise averaging device being inoperative at the time.
Figure 5:
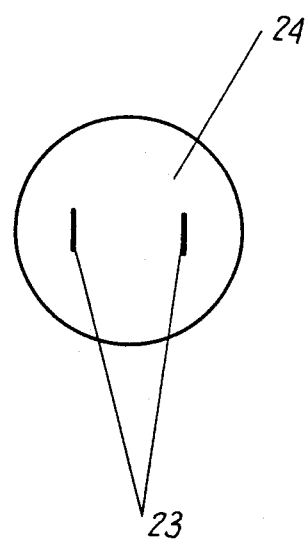
FIG. 5 shows the image seen in the pupil of the microscope, when the device is switched on and properly adjusted.

If the averaging member is not in use, in the exit pupil 21 of the lens 18 of the auxiliary microscope, two point-shaped foci 22 (FIG. 4) of the laser beam should be seen. In switching on the averaging member 15, with accordingly high averaging velocity, the point-shaped foci change form in two parallel sections 23 of a straight line (FIG. 5). By turning the averaging member 15 together with the slit 16 (FIG. 2) about the optical axis, the parallel sections of the straight line 23 (FIG. 5) are perpendicular to the straight line determined by both points 22 (FIG. 4). In this case, the eye-piece 19 a system of interference fringes is observed. By further turning of the members 15 and 16, as well as by the adjustment of the dimensions of the slit 16 the optimum contrast of the interference fringes is obtainable.

The system adjusted in the described way reduces considerably the noise level of the images being registered and reconstructed from a hologram.

If the conditions of the quality of optical path lengths of the object beam and of the reference beam are fulfilled at application of identical optical systems for forming these beams, the method of unidirectional averaging can also be applied in a holographic microscope operating in reflected light.

What is claimed is:

1. A holographic microscope for recording and reconstructing of holograms and for interferometric investigation comprising laser illumination means for producing a coherent laser beam, a device for suppression of coherent noise by unidirectional averaging, a member splitting the laser beam into a reference beam and an object beam, a first optical system for directing said object beam to a holographic recording material along a first path and for forming an image of an object on said recording material, and a second optical system similar to said first optical system for directing said reference beam to said recording material along a second path angularly displaced from said first path and having a length substantially equal to the length of said first path, the axes of said first and second paths lying in a plane, said device for unidirectional averaging of the coherent noise being positioned between said illuminating means and said beam splitting member and comprising a confocal pair of focusing lenses together defining an optical axis and focusing said laser beam to a spot intermediate said lenses, a mask having a slit aperture situated at said focused spot, and averaging means disposed in front of said mask for continuously deflecting said spot in one direction only along the lengthwise direction of said slit, said mask and averaging means being coupled for rotation about said optical axis so as to orient said one direction optically perpendicular to said plane containing said axes of said first and second paths.

2. The microscope as defined in claim 1 wherein said averaging means comprises a transparent rectangular prism rotating about an axis perpendicular to said slit and to the laser beam.

3. The microscope as defined in claim 1 wherein said averaging means comprises an electro-optical deflector.

4. The microscope as defined in claim 1 wherein said averaging means comprises an acoustic-optical deflector.

* * * * *